Patented Nov. 8, 1932

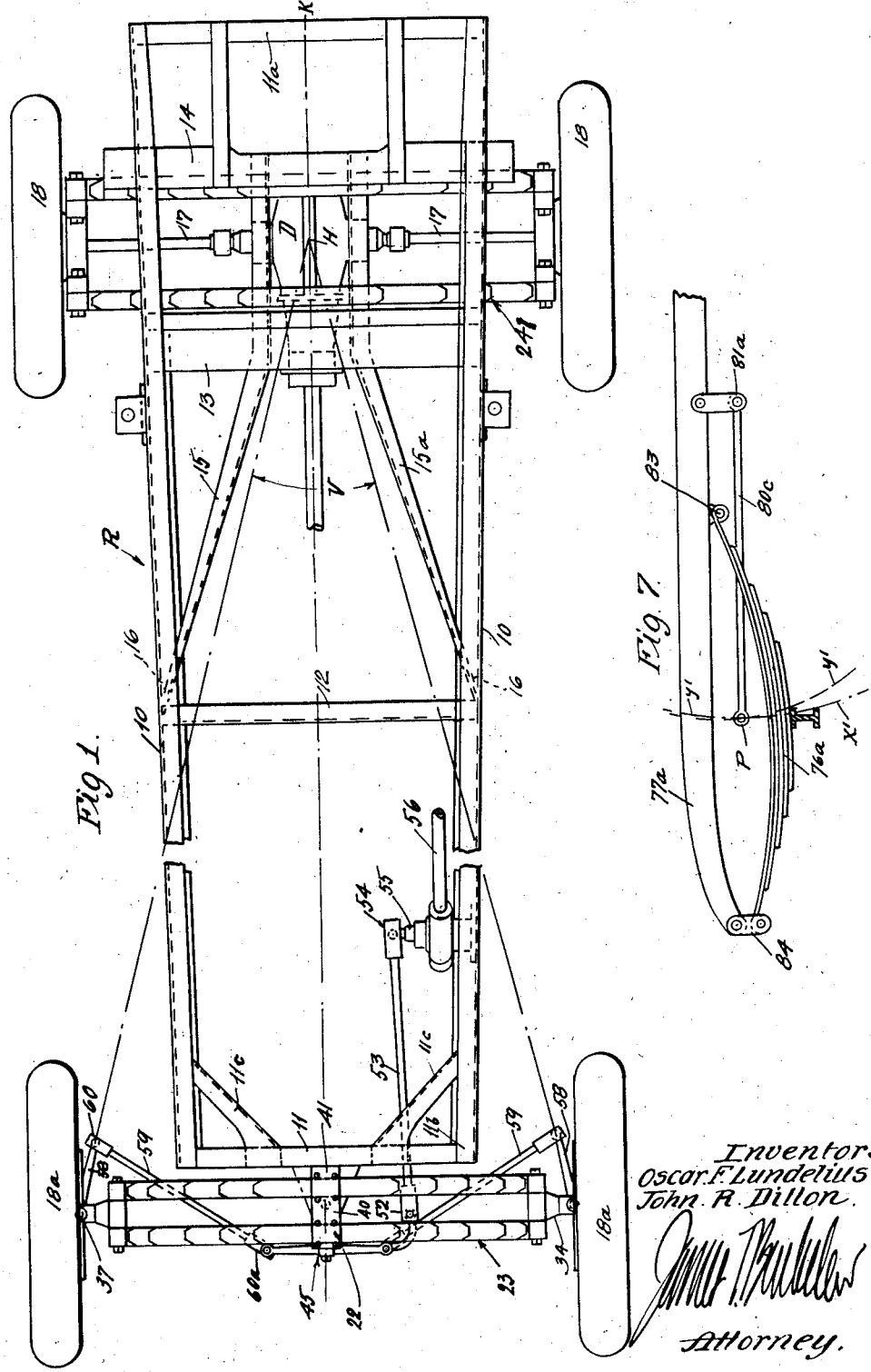

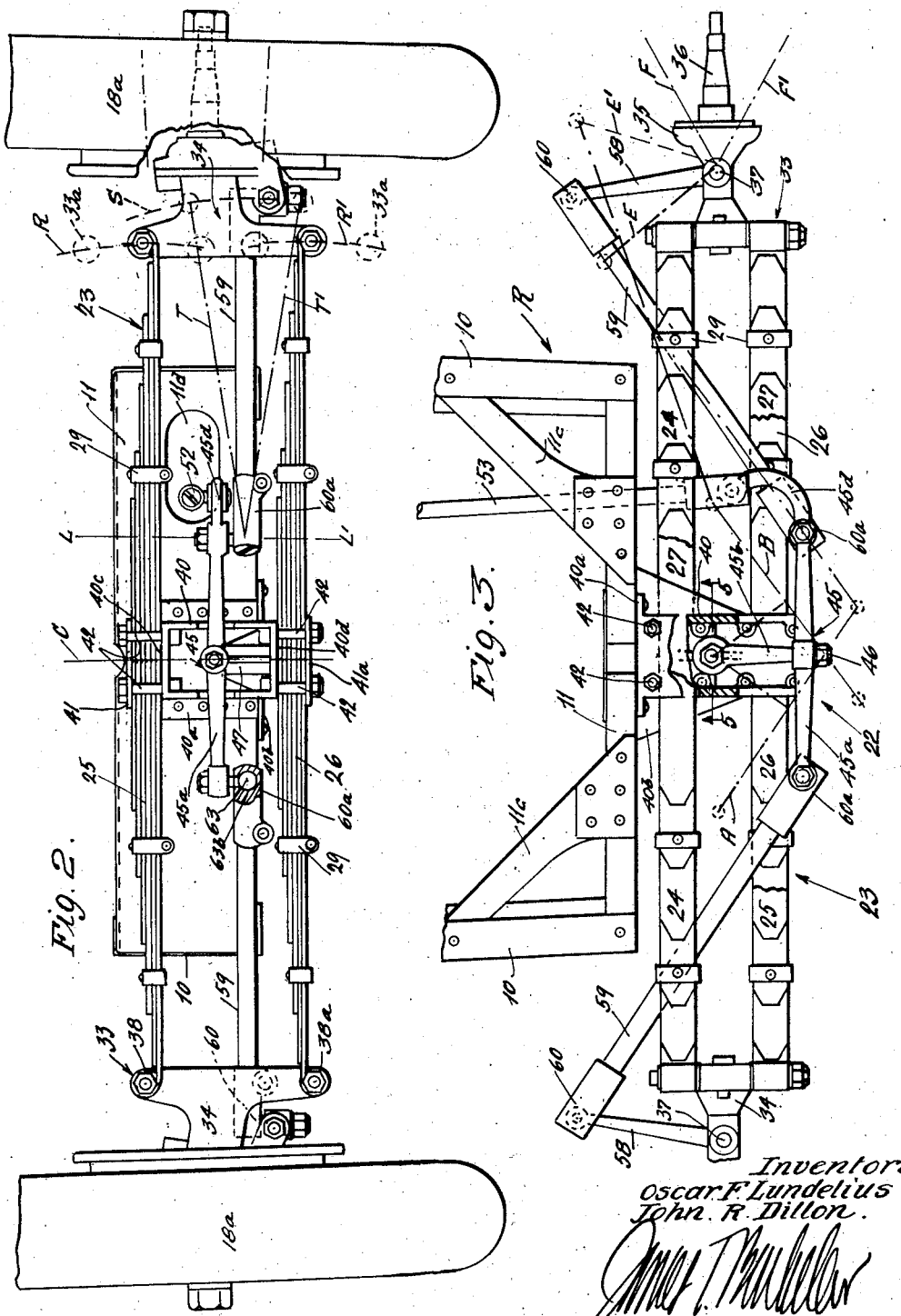

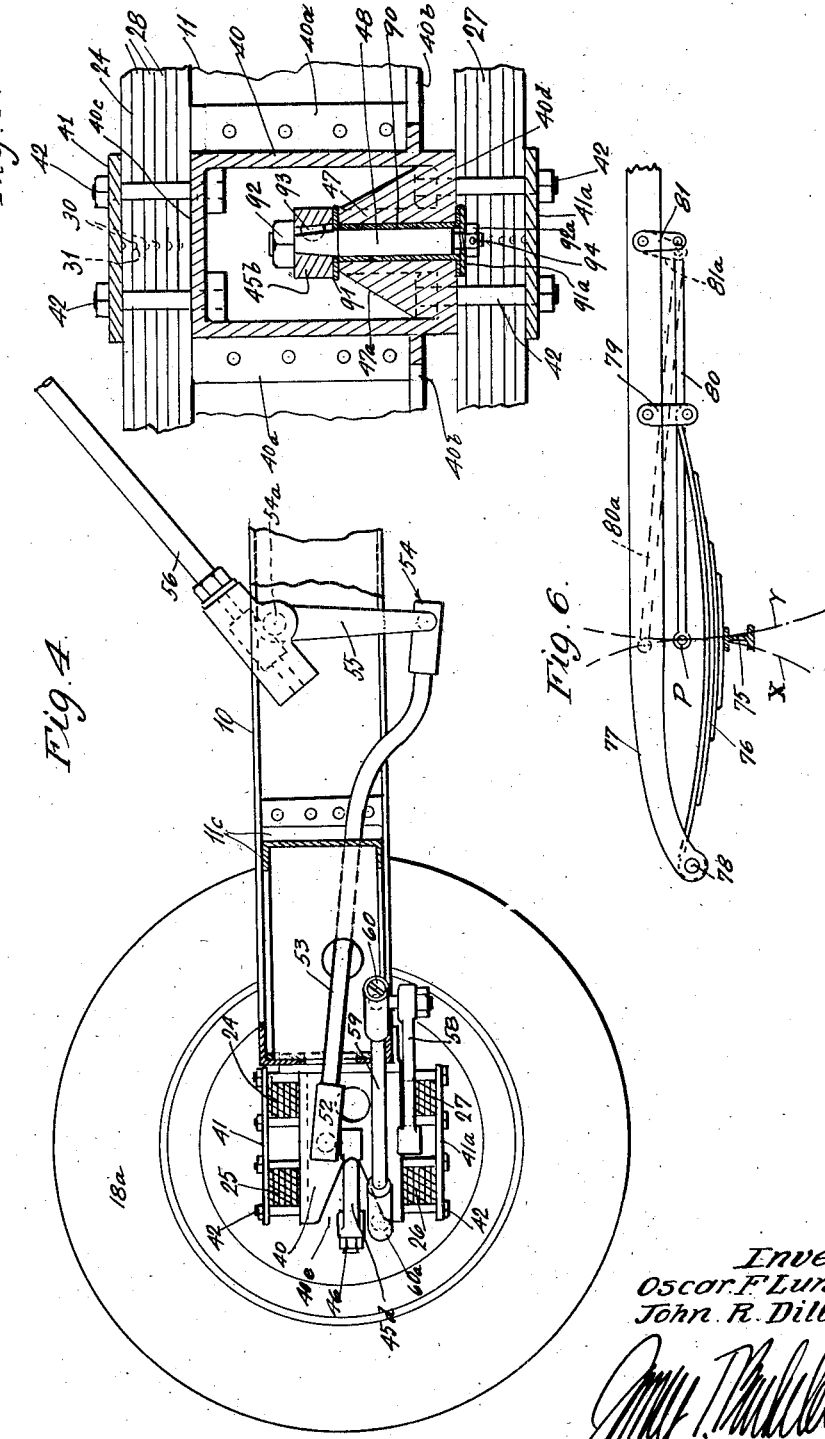

1,886,963

UNITED STATES PATENT OFFICE

OSCAR F. LUNDELIUS AND JOHN R. DILLON, OF LOS ANGELES, CALIFORNIA, ASSIGNORS TO LUNDELIUS & ECCLESTON MOTORS CORPORATION, OF LAS VEGAS, NEVADA, A CORPORATION OF DELAWARE

STEERING GEAR

Application filed January 9, 1929. Serial No. 331,228.

This invention relates generally to vehicle steering gear, and is concerned particularly with a mechanism of this nature for use in vehicles in which the body and related mechanisms are mounted on the wheels directly through springs rather than by way of rigid axles.

The various types of steering gear in common use embody certain characteristics that may be considered as having become more or less standardized upon, for instance, the maintenance of proper relationship between the tread, wheel base and the angle between the projected steering knuckle arms, all to the end that the gear may progress properly to cause the wheels to move in true arcs at any turning radius. Assuming that the wheels are not deflected from their normal positions by road irregularities, no difficulty would be experienced in providing steering gear that would operate satisfactorily under these conditions. However, it is apparent that consideration of vertical movement of the wheels must be had as well as their horizontal turning, and it is in compensating for such vertical movement that great difficulty is experienced in the design of steering apparatus. That such is the case is evidenced by the fact that in the operation of motor vehicles equipped with common types of steering gear, over rough roads, and often when driven over relatively smooth roads at high speed, the forward wheels are caused to wobble in the same direction of turning, this phenomenon being commonly termed "shimmying." This disturbance is brought about mainly on account of reactions on the gear occasioned by abnormal impact and relative vertical displacement of the wheels, the effect being accentuated greatly in proportion to the speed at which the vehicle is driven on account of gyroscopic action of the wheels and certain other reactions.

It is a general purpose of the present invention to provide a steering gear such that the difficulties mentioned are overcome to the extent that a vehicle equipped with the gear may be driven over rough roads and at high speed without transmittal of shocks to the operator or destructive forces or impacts on the gear. The result is that the vehicle has such inherent stability that it may be driven safely at all speeds over smooth or rough roads without fatigue to the operator or destructive wear on parts of the steering gear. As previously mentioned, the gear is designed primarily for use in vehicles in which unsprung weight is reduced to a minimum by connecting the body with the wheels directly through spring systems. Typical spring suspension systems of the general nature are described fully in the patent issued to Oscar F. Lundelius May 16, 1926, No. 1,576,920, on spring mounting; and also in his copending application on spring mounting, filed Dec. 13, 1926, Ser. No. 154,382.

It will be apparent that in vehicles having spring suspension systems of this character, the springs are capable of considerable action, and usually are subjected to greater flexure than springs in common mountings embodying rigid axles. It follows, therefore, that the present gear, in order to be used in combination with spring suspensions of this kind, must necessarily be especially adapted to compensate for wheel displacement. This result is attained, generally speaking, by two main provisions. First, instead of interconnecting the steering knuckle arms in the usual manner, that is, by a rigid tie rod, there is an individual tie rod joined to each steering knuckle, and the tie rods are joined at their other end to an actuating steering arm, all in a manner such that the wheels are controlled individually and caused to move oppositely when subjected to shock so that wobbling does not occur. And second, the arrangement and connections of the rods are such that they are free to move universally about their points of connection with the actuating steering arm to describe substantially the same arc followed by their point of connection with the steering knuckle, and without play in the joints.

The invention will be readily understood from the following detailed description of a preferred embodiment thereof, and also of certain typical features common to various well known steering gear, and spring mountings, the latter being included only, however, for the purpose of aiding in setting forth the features of the invention. Reference is had throughout the description to the annexed drawings, in which:

Figure 1 is a plan view of a vehicle chassis equipped with the present steering gear, parts of the chassis being conventionally illustrated;

Fig. 2 is an enlarged elevation of the forward end of the chassis;

Fig. 3 is a plan view of Fig. 2, a portion of the box spring support being broken away to show the steering and mounting, and the vehicle wheels being removed to illustrate the carrier and steering knuckle joint;

Fig. 4 is a side elevation of the steering apparatus, one of the wheels with its carrier being omitted and a portion of the frame broken away to show the steering gear arrangement more clearly;

Fig. 5 is a section on line 5—5 of Fig. 3;

Fig. 6 is a diagrammatic view illustrating a common type of spring suspension; and Fig. 7 is a view similar to Fig. 6 illustrating another common form of spring mounting.

It is to be understood at the outset that although we have shown spring suspension systems in which the several springs are arranged with certain symmetry, the present invention is in no way limited to use in vehicles having spring suspension systems of such symmetrical arrangement, and that the invention is applicable for use in combination with suspension systems embodying a lesser number of springs in each unit. Furthermore, the various elements comprising the steering gear may be arranged in similar general positions by mountings other than that illustrated, and except for such claims as definitely set forth a predetermined number or arrangement of the individual springs, and specify the particular form of spring and steering gear mounting shown, the claims are to be considered unlimited as regards the number or relative arrangement of springs and to the specific structural characteristics of the spring and steering gear mounting.

As shown in Fig. 1, the vehicle frame R comprises the side channel rails 10, the forward and rear end rails 11 and 11a, respectively, and cross braces 12, 13 and 14. The structure also includes a pair of rearwardly converging rails 15, 15a, joined to the side rails at 16, and also to the cross braces 13 and 14. The differential D is mounted directly on the rails 15, 15a, and drive is transmitted from the differential to the rear wheels 18 by way of drive shafts 17 equipped with proper universal joints to compensate for relative movement between the wheels and body due to spring structure. Mounted on the forward end rail 11 of the body is the spring and steering gear support generally indicated at 22 and which will later be described in detail. The frame is strengthened against longitudinal thrust imparted thereto to the supporting structure 22, by means of the diagonal braces 11c, thus relieving the end rail 11 and also the corner joint 11b between the side and end rails from excessive strain. The present frame construction is more fully shown and described in our copending application on Chassis, Ser. No. 331,229, filed on even date herewith.

The forward and rear spring suspension units 23 and 24' each embody four lateral springs which are symmetrically arranged about substantially vertical and horizontal axial planes, to the advantage that stresses and strains resulting from road shock are uniformly distributed throughout the spring suspension systems rather than being concentrated on any one or less than the entire number of springs or their points of mounting. Insofar as the present steering gear is concerned, however, the showing of a definite number of springs and the symmetrical arrangement thereof, is to be considered merely as illustrative of typical spring suspension systems with which the gear may be used, for it will be readily apparent that it may be used in combination with spring suspension systems having a lesser number of springs and a different spring arrangement.

We will describe only the front suspension 23 inasmuch as the rear spring suspension has no direct bearing on the invention, although the general nature of this system will be apparent from the description of the former.

The front suspension embodies the four symmetrically arranged springs 24, 25, 26 and 27, the springs being made up in the usual manner with leaves 28, held together by clips 29, the leaves being prevented from relative longitudinal slippage by means of the interfitting nibs 30 and recesses 31 formed in the springs at their center points (see Fig. 5). The springs are terminally and pivotally connected at 33 to the wheel carriers 34; and the steering knuckles 35, carrying wheel spindles 36, are pivoted for horizontal turning on the wheel carrier at 37. It will be noted that the eyes 38 and 38a of the upper and lower springs, respectively, are turned, relative to the springs, in vertically opposite directions, the purpose and advantages of which are fully set forth in our copending application on vehicle spring system, Ser. No. 331,227 and filed on even date herewith. The present invention, however, is in no way restricted to this feature.

The several springs, as well as certain parts of the steering gear to be later described, are mounted on the vehicle frame by means of the supporting structure generally indicated at 22. The support is substantially a bracket in the form of the horizontal rectangular box 40 joined to the front end rail 11 at its horizontal center and arranged substantially symmetrical with the vertical and longitudinal axis K of the frame. The box is shaped to provide flanges 40a and 40b which are riveted to the front and bottom faces, respectively, of the end rail 11. The springs are symmetrically arranged on the box, with their horizontal centers in the vertical axial plane of the box, and are confined between the upper and lower sides 40c, 40d, of the box, and plates 41, 41a, by means of stud bolts 42 threaded into the box. The lateral spacing of the bolts preferably does not exceed that necessary to secure the mounting against torsional strains. The bolts are spaced longitudinally of the box at intervals such as to confine the springs against lateral movement.

In the copending application referred to above, other forms of spring supporting structures and individual spring mountings are shown, all having certain general features of similarity with the present type. The individual spring mountings mentioned were provided for the purpose of enabling the springs to flex from substantially their horizontal center C, instead of being rigidly clamped to the mounting as in the present structure. However, the hereinafter described steering gear may be used to advantage regardless of the particular mounting used. The present supporting structure is desirable from a standpoint of sturdy and simple construction, and certain features of advantage in other mountings to enable the most effective spring action, are dispensed with in favor of simpler construction.

The support 40, in addition to serving as a mounting for the various springs, is utilized as a mounting for the horizontal T-shaped steering arm generally indicated at 45 and mounted between the upper and lower springs. The steering arm embodies the horizontally extending front cross arm 45a, and the center arm 45b extending through and horizontally at right angles with the cross arm and substantially along the longitudinal axis K of the frame, the cross arm being held on the outer end of arm 45b by means of the nut 46. As shown in Fig. 5, box 40 is provided with an upstanding interior boss 47 having strengthening webs 47a, the steering arm being pivotally mounted at its inner end upon boss 47 by means of pin 48 extending through the inner end of arm 45b and into the boss. The pin extends through the brass liner 90 and is held snugly against vertical movement by nuts 92 and 92a bearing against arm 45b and washer 91a, respectively. The arm is secured to the pin by means of the Woodruff key 93, held in place by the upper nut, and the lower nut is prevented from turning by cotter key 94. A second washer 91 is placed between the arm hub and the top of the boss to provide suitable turning bearing for the hub. The steering arm therefore is capable of horizontal swinging movement about pivot 48 to the dotted line positions A and B, openings 40e being formed in support 40 to permit this swinging movement. The invention is not restricted to the use of the particular type of box mounting shown, for various modifications in this support may be made. One variation, for instance, is shown in our copending application on spring mounting, Ser. No. 331,230 and filed on even date herewith.

The forward steering arm 45a has an integral arcuate extension 45d at one end, the drag link 53 being joined to the outer end of said extension by means of the ball-and-socket joint conventionally illustrated at 52. As shown in Fig. 2, the drag link extends rearwardly through opening 11d in the forward end rail 11, and is pivotally connected at 54 to the vertically extending arm 55 which, when actuated in the usual manner through the steering wheel shaft 56, causes arm 55 to swing about the pivot 54a thereby imparting longitudinal movement to the drag link 53.

The steering arm 45a is terminally connected to the steering knuckle arms 58 by means of the horizontal tie rods 59, the connections between these parts being made through universal or ball-and-socket joints 60 and 60a. The vertical planes of the tie rods, it will be noted, diagonally intersect the normal axial center line of the wheels, or what would be a line drawn through the centers of pivots 37. Joints 60 and 60a may be made up in any suitable manner; for instance, as shown in Fig. 2, the joint 60a comprises the ball 63 mounted on the end of arm 45a, the complementary socket 63b being carried on the ends of the tie rod. Joints 60a are similarly formed. It will be apparent that by virtue of these connections, vertical as well as horizontal relative turning movement between the elements of the gear may take place with complete freedom.

Upon vertical movement of wheels 18a and wheel carriers 34, relative to the spring support 40, the ends of the springs, at the points 33 of connection with the wheel carriers, move in arcs R, R' the centers of which may be considered as lying on a vertical line L—L' representing substantially the center of flexure of the spring arms on each side of the rigid center mounting. The displaced locations of points 33 are represented by the dotted positions 33a. Should other types of spring mountings mentioned hereinabove be employed, the center point of flexure of the springs may be caused to lie near the center line C through the mid-points of the springs. Similarly, the point of connection of the tie rods with the steering knuckle arms 58, taken as joint 60a, describes an arc, upon vertical displacement of the wheels, having its center substantially in a vertical plane normal to the springs and through line L—L', this arc being representd by the dotted line S. Due to the characteristics of the spring flexure, arms R and S may not be truly circular, as it is apparent that upon excessive flexure the curvature of the arcs would tend to increase. Thus it is seen that vertical displacement of the wheels is accompanied by their lateral inward movement to compensate for the spring flexure.

Movement of the T-shaped steering arm to the dotted positions A and B by drag link 53 obviously is accompanied by horizontal turning of the steering knuckle arms 58 and the spindle 36 about pivot 37 to the dotted line positions E, E' and F, F', respectively. It will be noted that although the various units of the gear are so interconnected that turning movement of one wheel is simultaneously accompanied by proper turning movement of the other wheel, the arrangement of the gear parts is such that the wheels are capable of individual vertical movement while under control of the gear and without destructive reactions on the parts thereof. It is assumed, of course, that in order for the gear to progress properly in causing the wheels to move in true arcs at any turning radius, the correct dimensional relations exist between the tread, wheel base and the projected angle V (see Fig. 1) of the steering knuckle arms. This angle usually is such that its apex H lies in the mid point of the rear axle, thereby determining the angle between the wheel spindles and the steering knuckle arms.

It may also be mentioned that certain dimensional relationships will be had between the length of arm 45b, branch arms 45a, tie rods 59, and that of steering knuckle arms 58, in order for the gear to progress properly and to accommodate flexure of the springs without binding. And since these relationships may vary for different constructions, no fixed relative proportions for the dimensions of the various parts can be given, since the required change in length of one part may necessitate varying the other accordingly.

The various features embodied in the present steering gear which enable an equipped vehicle to be driven over rough roads and at high speed without transmittal of shock to the operator or destructive forces to the gear, may be most clearly understood first by reference to certain types of more or less standard gear and spring mounting, and the manner in which difficulties inherent in these are overcome by the invention. Referring to Fig. 6, it will be seen that in one common form of mounting, the front axle 75 of the vehicle is carried directly on the spring 76, the latter being pivoted at its front end to the frame 77 at 78, and suspended at its rear end from the frame by means of the link or arm 79. The drag link 80 is pivoted to the usual actuating arm 81 mounted on the frame to the rear of link 79 the drag link being connected to the steering arm, (not shown) at the conventionally illustrated point P. Upon vertical displacement of the wheel, (not shown) and therefore axle 75, causing the spring to flex and link 79 to assume the dotted position shown, the joint between the steering knuckle arm and tie rod represented by point P is caused to travel the arc x having its center at 78. Arm 81 being stationary, the forward end of the drag link 80 tends to describe the arc y having its center at 81a as indicated by the dotted positions T, T'. The effect had is obvious, inasmuch as the joint at P must necessarily follow the arc x causing the drag link to move corespondingly to a position 80a on arc x instead of a normal position on arc y. This results in a proportionate movement of arm 81 to the dotted position 81a, this movement in turn being transmitted through the steering wheel shaft to the steering wheel. An additional undesirable effect is had in that since the various elements of the gear are thrown out of their normal positions, the wheels likewise are caused to turn abnormally in unison, thereby producing the effect commonly known as "wobbling". In this type of gear and mounting, the described effects may be compensated for in part by lengthening the drag link 80 beyond the point P, thereby causing arc y to flatten somewhat and more nearly approach arc x.

The construction shown in Fig. 7 is generally similar to that of Fig. 6 except that the spring 76a is pivoted at its rear end at 83 and suspended from the frame at its forward end by means of link 84. The mounting of drag link 80c is assumed to be the same as before. The point P, upon vertical movement of the axle, describes the arc x' having its center at 83. Similarly, the drag link describes the arc y' as in the previous instance. It is apparent that in this case the arcs are more nearly coincidental, but their divergence is, even under these conditions, sufficient to cause considerable longitudinal movement of the drag link with resultant jar to the steering wheel. Practical construction prohibits mounting the drag link in such a manner that the points 81a and 83 coincide, in which event arcs x' and y' would be the same and no abnormal movement would be imparted to the drag link.

It is this latter ideal condition that is, in effect, attained in the present steering gear and although the arrangement of the parts varies from that of members of the previously described common types, the effects to be compensated, arising from vertical displacement of the wheels, are the same in either instance. Thus, in the present gear, upon vertical movement of the wheel 18a causing the steering knuckle arm at its point of connection 60 with the tie rod, to move along arc S, said tie rod moves about joint 60 as a center to terminally describe an arc substantially coincidental with arc S with the result that no thrust is imparted to the tie rod and therefore, none to the steering arm 45a or the drag link 53. Should the wheels be subjected to such severe impact that the springs are caused to flex abnormally beyond their usual range, the arc followed by the steering arms and the tie rods may converge slightly, but the resultant disturbance to the gear and operator is negligible.

In view of the fact that the wheels are, in a sense, individually controlled by the separate tie rods, one wheel, upon passing over an obstruction, may be subjected to considerable deflection without affecting the position of the other wheel or its tie rod, a feature not had by the usual gear inasmuch as the steering knuckle arms are ordinarily interconnected with a single tie rod, and movement of one arm is necessarily followed by movement of the other arm to a corresponding degree. It may be stated that in order that the arc terminally described by the tie rod may coincide with that traversed by the knuckle arm joint, the joint 60a is located substantially on the line L—L' representing the center line of oscillation of the wheel and other parts mounted on the carrier.

We claim:

1. Steering mechanism for spring supported vehicles wherein the wheels and their steering knuckles are connected to the vehicle frame through vertically spaced springs arranged transversely of the longitudinal axis of the vehicle, embodying a steering arm pivotally mounted on the frame substantially midway vertically between the springs and adapted to swing horizontally, a pair of independently movable tie rods extending diagonally between said springs and connected for universal relative movement with one each of the steering knuckles and with said steering arm, the vertical planes of said tie rods diagonally intersecting the normal axial center line of the wheels, and the points of connection of said tie rods with the steering arm and steering knuckles being at opposite sides of said center line, and means for actuating the steering arm to control the wheel movement.

2. Steering mechanism for spring supported vehicles wherein the wheels and their steering knuckles are connected to the vehicle frame through vertically spaced springs arranged transversely of the longitudinal axis of the vehicle, embodying a T-shaped steering arm comprising a horizontally swinging center arm pivotally mounted on the frame and extending between the springs, and a horizontal cross arm mounted centrally on the center arm and substantially at right angles therewith, a pair of tie rods extending diagonally between said springs and terminally connected by universal joints with the ends of said cross arm and with the steering knuckles, the vertical planes of said tie rods diagonally intersecting the normal axial center line of the wheels, and the points of connection of said tie rods with the steering arm and steering knuckles being at opposite sides of said center line, and means for actuating the steering arm to control the movement of the wheels.

3. Steering mechanism for spring supported vehicles wherein the wheels and their steering knuckles are connected to the vehicle frame through springs arranged transversely of the longitudinal axis of the vehicle, embodying a T-shaped steering arm comprising a horizontal center arm pivotally mounted on the frame and adapted to swing horizontally, and a horizontal cross arm mounted centrally on the center arm and substantially at right angles therewith, said cross arm having an extension at one end; a pair of tie rods having universal joint connections with said cross arm at points substantially equidistant from said center arm and universally connected with the steering knuckles, and a drag link pivotally connected with the cross arm extension.

4. In a vehicle of the character described, steering gear embodying a T-shaped steering arm comprising a horizontal center arm pivotally mounted on the vehicle frame and adapted to swing horizontally, and a horizontal cross arm mounted centrally on the center arm and substantially at right angles therewith, a pair of tie rods terminally connected by universal joints with the ends of said cross arm and with the vehicle wheel steering knuckles, and a drag link connected directly to said horizontal cross arm for actuating said steering arm to control the movement of the wheels.

5. Steering mechanism for spring supported vehicles wherein the wheels and their steering knuckles are connected to the vehicle frame through vertically spaced springs arranged transversely of the longitudinal axis of the vehicle, embodying a support mounted on said frame and carrying said springs, a steering arm pivotally mounted on said support at a point vertically intermediate the springs, and adapted to swing horizontally in an arc concaved forwardly of the frame, a pair of tie rods extending diagonally between said springs and having universal joint connections with the steering arm and with the steering knuckles at opposite sides of the normal axial center line of the wheels, and means for actuating said steering arm to control the wheel movement.

6. Steering mechanism for spring supported vehicles wherein the wheels and their steering knuckles are connected to the vehicle frame through vertically spaced springs arranged transversely of the longitudinal axis of the vehicle, embodying a horizontally extending support mounted centrally on the forward end of the frame and carrying said springs, a T-shaped steering arm mounted on said support vertically intermediate the springs, said steering arm comprising a horizontal center arm pivotally mounted at its inner end for horizontal swinging movement and normally extending substantially along the longitudinal axis of the frame, and a horizontal cross arm mounted centrally on the outer end of the center arm and at right angles therewith, a pair of tie rods extending diagonally between said springs and universally connected with the ends of said cross arm and with the steering knuckles at opposite sides of the normal axial center line of the wheels, and means for actuating the steering arm to control the movement of the wheels.

7. Steering mechanism for spring supported vehicles wherein the wheels and their steering knuckles are connected to the vehicle frame through vertically spaced springs arranged transversely of the longitudinal axis of the vehicle, embodying a horizontally extending supporting box mounted centrally on the forward end of the frame, the springs being carried on the top and bottom surfaces of said box, a horizontal steering arm comprising a center arm pivotally mounted at its inner end within said box and extending forward of the frame to connect centrally and at right angles with a substantially integral cross arm, a pair of tie rods universally connected with the ends of said cross arm and with the steering knuckles, and means for actuating the steering arms, said means embodying an extension on one end of the cross arm and a drag link pivotally connected to said extension.

8. In a vehicle wherein the wheels and their steering knuckles are connected to the vehicle through vertically spaced springs arranged transversely of the longitudinal axis of the vehicle, a horizontal support extending centrally from the forward end of the frame and carrying said springs on its upper and lower surfaces, a horizontal steering arm, projecting forward of the frame, pivotally mounted on said support between the upper and lower springs and adapted to swing horizontally, and a pair of independently movable tie rods extending diagonally between said springs and connected with the steering arm and with said steering knuckles at opposite sides of the normal axial center line of the wheels.

9. In a vehicle wherein the wheels and their steering knuckles are connected to the vehicle through vertically spaced springs arranged transversely of the longitudinal axis of the vehicle, a horizontal rectangular supporting box extending centrally from the forward end of the frame and substantially symmetrical with the vertical and longitudinal axial plane thereof, means for securing the upper and lower springs to the respective surfaces of said box, a horizontal steering arm comprising a center arm pivotally mounted at its inner end within said box and extending toward the outer end thereof to connect centrally and at right angles with a cross arm, and a pair of independently movable tie rods extending diagonally between said springs and each connected with one end of said cross arm and with one of the steering knuckles at opposite sides of the normal axial center line of the wheels.

10. In a vehicle wherein independent wheel supporting members are directly connected to the vehicle frame through four springs extending transversely of the longitudinal axis of the vehicle and arranged substantially symmetrically about horizontal and vertical axial planes, steering knuckles connecting the wheels and their associated supporting members; a horizontal rectangular supporting box extending centrally from the forward end of the frame and substantially in alinement with the longitudinal axis thereof, means for securing the upper and lower springs respectively to the upper and lower surfaces of said box; a horizontal steering arm embodying a center arm pivotally mounted at its inner end within said box and extending toward the outer end thereof to connect centrally and at right angles with a cross arm, a drag link pivotally connected with said cross arm at one end thereof; and a pair of tie rods connected at one end each of the cross arm for relative universal movement and having universal joint connections with the steering knuckles.

11. Steering mechanism for spring supported vehicles wherein the wheels and their steering knuckles are connected to the vehicle frame through vertically spaced springs arranged transversely of the longitudinal axis of the vehicle, the steering knuckle having vertical oscillatory movement about a given horizontal center line; embodying a tie rod extending diagonally between said springs and pivotally connected at its outer end to said steering knuckle, the vertical plane of said tie rod diagonally intersecting the normal axial center line of the wheels, and the points of connection of said tie rod with the steering arm and steering knuckle being at opposite sides of said center line, said tie rod being pivotally mounted at its inner end at a point substantially in line with the centers of flexure of said springs.

12. Steering mechanism for spring supported vehicles wherein the wheels and their steering knuckles are connected to the vehicle frame through springs arranged transversely of the longitudinal axis of the vehicle, each steering knuckle having vertical oscillatory movement about a given horizontal center line; embodying a steering arm mounted on the frame, and a tie rod extending diagonally between said springs and pivotally connected at its outer end to said steering knuckle, said tie rod being pivotally connected at its inner end to said steering arm at a point substantially in line with the centers of flexure of said springs, the vertical plane of said tie rod diagonally intersecting the normal axial center line of the wheels, and the points of connection of said tie rod with the steering arm and steering knuckle being at opposite sides of said center line.

13. Steering mechanism for spring supported vehicles wherein the wheels and their steering knuckles are connected to the vehicle frame through vertically spaced springs arranged transversely of the longitudinal axis of the vehicle, embodying a steering arm pivotally mounted on the frame substantially midway vertically between the springs and adapted to swing horizontally, a tie rod extending diagonally between said springs and having universal joint connections with the steering arm and with a wheel steering knuckle, the center of swinging of said tie rod about its connection with said steering arm being substantially in line with the centers of flexure of the springs, the vertical plane of said tie rod diagonally intersecting the normal axial center line of the wheels, and the points of connection of said tie rod with the steering arm and steering knuckle being at opposite sides of said center line, and means for actuating said steering arm to control the wheel movement.

14. Steering mechanism for spring supported vehicles wherein the wheels and their steering knuckles are connected to the vehicle frame through vertically spaced springs arranged transversely of the longitudinal axis of the vehicle, embodying a horizontally swinging steering arm pivotally mounted on the frame substantially midway vertically between the springs and extending forward thereof, a pair of tie rods extending diagonally between said springs and each having universal joint connections with the steering knuckles and with said steering arm at points spaced transversely of the frame, said points of connection of the tie rods with the steering arm being located substantially in line with the centers of flexure of the springs, the vertical planes of said tie rods diagonally intersecting the normal axial center line of the wheels, and the points of connection of said tie rods with the steering arm and steering knuckles being at opposite sides of said center line, and means for actuating the steering arm to control the movement of the wheels.

15. In a vehicle of the character described, steering gear for operating the dirigible wheels of the vehicle comprising, a steering arm pivotally mounted at its inner end for horizontal swinging movement, a pair of tie rods connected with the wheels and with the outer end of the steering arm at points spaced transversely of the vehicle, said outer end of the steering arm being adapted to swing in an arcuate path about the pivotal mounting of the arm at its inner end, and a drag link connected to one side of said outer end of the arm and at the outside of the point of connection of one of the tie rods with the arm.

16. In a vehicle of the character described, steering gear for operating the dirigible wheels of the vehicle comprising a T-shaped steering arm comprising a horizontal center arm pivotally mounted for horizontal swinging movement and a horizontal cross arm mounted on the center arm and at substantially right angles therewith, a pair of tie rods connected to said wheels and with said cross arm, and a drag link connected to said cross arm at the outside of the point of connection of one of the tie rods therewith.

17. Steering mechanism for spring supported vehicles wherein the wheels and their steering knuckles are connected to the vehicle frame through vertically spaced springs arranged transversely of the longitudinal axis of the vehicle, embodying a movable steering member extending between upper and lower springs, a pair of tie rods each extending diagonally between said springs, having universal joint connections with said steering member and one of the steering knuckles at opposite sides of the normal axial center line of the wheels, and means for actuating said steering member to control the wheel movement, the points of connection between the tie rods and said steering member being so located, longitudinally of the springs, that the tie rods describe arcs of substantially the same curvature as the steering knuckles, upon vertical movement of the wheels.

18. Steering mechanism for spring supported vehicles wherein the wheels and their steering knuckles are connected to the vehicle frame through vertically spaced springs arranged transversely of the longitudinal axis of the vehicle, embodying a movable steering member extending forwardly of the vehicle frame between upper and lower springs, a pair of tie rods each extending diagonally rearwardly from said steering member between said upper and lower springs, said tie rods having universal joint connections with said steering member and the steering knuckles at opposite sides of the normal axial center line of the wheels, and means for actuating said steering member to control the wheel movement, the points of connection between the tie rods and said steering member being so located, longitudinally of the springs, that the tie rods describe arcs of substantially the same curvature as the steering knuckles, upon vertical movement of the wheels.

19. Steering mechanism for spring supported vehicles wherein the wheels and their steering knuckles are connected to the vehicle frame through vertically spaced pairs of springs extending transversely of the vehicle, embodying a steering member extending between upper and lower springs, a tie rod extending diagonally between the upper and lower pairs of springs and having universal joint connections with said steering member and one of the steering knuckles at opposite sides of the normal axial center line of the wheels, and means for actuating said steering member to control the wheel movement, the point of connection between the tie rod and said steering member being so located, longitudinally of the springs, that the tie rod describes an arc of substantially the same curvature as the steering knuckle to which it is connected, upon vertical movement of the wheel associated with said steering knuckle.

20. In spring supported vehicles wherein the wheels and their steering knuckles are connected to the vehicle frame through vertically spaced pairs of springs extending transversely of the vehicle, means for attaching said springs to the frame at its forward end, a steering arm mounted on the frame and projecting forwardly thereof between upper and lower springs, a pair of tie rods extending diagonally between the upper and lower pairs of springs and having universal joint connections with the steering members and the steering knuckles at opposite sides of the normal axial center line of the wheels, and means for actuating said steering member to control the wheel movement, the points of connection between the tie rods and said steering member being so located, longitudinally of the springs, that the tie rods describe arcs of substantially the same curvature as the steering knuckles, upon vertical movement of the wheels.

In witness that we claim the foregoing we have hereunto subscribed our names this 13th day of December, 1928.

OSCAR F. LUNDELIUS.
JOHN R. DILLON.